United States Patent
Yerazunis et al.

(10) Patent No.: US 6,600,657 B1
(45) Date of Patent: Jul. 29, 2003

(54) ACCESSORY ADAPTED FOR DIGITAL PERSONAL ASSISTANT

(75) Inventors: William S. Yerazunis, Acton, MA (US); Max P. Bajracharya, Cambridge, MA (US); Andrew H. Carlson, Seattle, WA (US); Joshua N. Migdal, Brockton, MA (US); Curtis A. Wickman, Toronto (CA)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/415,635

(22) Filed: Oct. 12, 1999

(51) Int. Cl.[7] .................................................. H05K 1/14
(52) U.S. Cl. ...................................... 361/737; 361/740
(58) Field of Search .................................. 439/945, 950, 439/928.1; 361/752, 753, 728, 730, 737, 724–727, 740

(56) References Cited

U.S. PATENT DOCUMENTS

| | | | |
|---|---|---|---|
| 5,664,231 A | 9/1997 | Postman et al. | 395/893 |
| 5,675,524 A | 10/1997 | Bernard | 364/705 |
| 5,675,525 A * | 10/1997 | Liao | 713/321 |
| 5,708,853 A | 1/1998 | Sanemitsu | 395/893 |
| 5,768,163 A | 6/1998 | Smith, II | 364/705 |
| 5,808,672 A | 9/1998 | Wakabayashi et al. | 348/220 |
| 5,815,205 A | 9/1998 | Hashimoto et al. | 348/373 |
| 5,867,218 A | 2/1999 | Matsuzaki et al. | 348/373 |
| 5,936,609 A | 8/1999 | Matsuoka et al. | 345/156 |
| 5,948,086 A | 9/1999 | Lin | 710/100 |
| 5,991,468 A | 11/1999 | Murakami et al. | 358/473 |
| 6,009,336 A | 12/1999 | Harris et al. | 455/566 |
| 6,036,098 A | 3/2000 | Goldman et al. | 235/486 |
| 6,041,374 A | 3/2000 | Postman et al. | 710/73 |
| 6,050,848 A * | 4/2000 | Yao | 439/483 |
| 6,065,880 A | 5/2000 | Thompson | 385/88 |
| 6,083,353 A | 7/2000 | Alexander, Jr. | 202/158 |
| 6,217,359 B1 * | 4/2001 | Chang | 439/297 |
| 6,219,256 B1 * | 4/2001 | Wu | 361/759 |
| 6,230,214 B1 * | 5/2001 | Liukkonen et al. | 359/173 |

OTHER PUBLICATIONS

Eyemodule Digital Camera. www.eyemodule.com.
"Artificial Retina Chip"; Mitsubishi Electric Inc., No. M64283FP. Mitsubishi Electric Corporation, Semiconductor Technical Data.
"Single–Chip 32–Bit CMOS Microcomputer", No. M32000D4AFP, Mitsubishi Microcomputers.
"1/3" Black & White CIF Image Sensor, No. M64287U, Mitsubishi Semiconductor Technical Data–Brief. Mitsubishi Electric Corporation, 1998.
"Mitsubishi Integrated Circuit Linear IC"; No. M64285FP, Mitsubishi Electric Corporation, Technical Data Sheet.
"1/3" Color CIF Image Sensor, No. M64289U, Mitsubishi Semiconductor Technical Data–Brief. Mitsubishi Electric Corporation, 1998.

\* cited by examiner

*Primary Examiner*—David Martin
*Assistant Examiner*—Thanh S. Phan
(74) *Attorney, Agent, or Firm*—Dirk Brinkman; Andrew Curtin

(57) ABSTRACT

An accessory is adapted to operate with a personal digital assistant. The accessory includes a housing physically enclosing an electrical interface externally accessible by the personal digital assistant, and a pair of opposing members arranged on the housing to rigidly mount the personal digital assistant in a fixed relationship with the accessory. The opposing members are spring loaded by a spine portion of the housing.

5 Claims, 9 Drawing Sheets

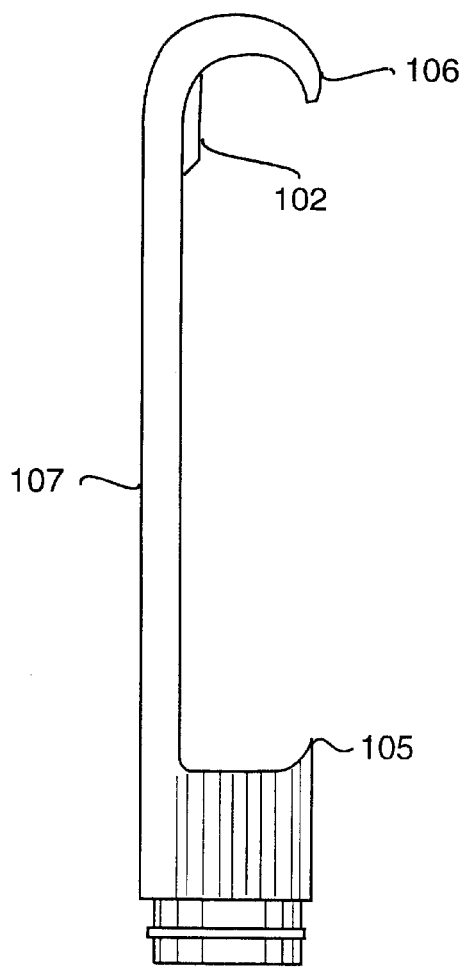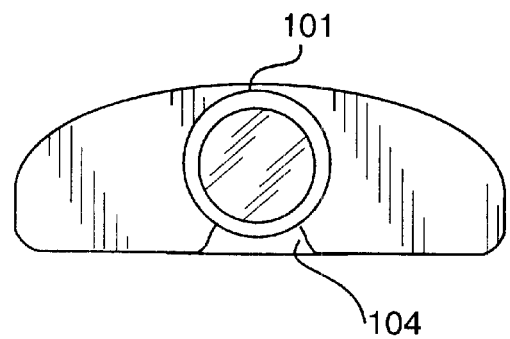
FIG. 6
FIG. 7

ACCESSORY ADAPTED FOR DIGITAL PERSONAL ASSISTANT

FIELD OF THE INVENTION

This invention relates generally to computer accessories, and more particularly to accessories adapted for use with digital personal assistant devices.

BACKGROUND OF THE INVENTION

In the prior art, digital still cameras have been adapted to work with workstations, personal computers, and even laptop devices.

In U.S. Pat. No. 5,708,853, Sanemitsu describes a Personal Computer Memory Card International Association (PCMCIA) card that includes an image input device. The card can be inserted into an PCMCIA slot of a lap-top computer. In one configuration, holes are formed in the casing of the lap-top so that an image input device can acquire a picture. The card requires that the computer device is equipped with PCMCIA "slot" and mounting frame.

There are a number of problems with this configuration. First, the PCMCIA standard requires that the dimensions of the slot be about 9×6×1.5 cm. For many modern PDA's, such as a PalmPilot (12×8×1.5), the slot and frame would consume nearly the entire interior of the PDA. In such applications, the card according to Sanemitsu would be totally unworkable. More recent PDA are even smaller than the PCMCIA card.

Second, the PCMIA card has two connectors, front and back. The back 64 pins interface to the computer, and the front pins, which vary depending on the communications interface, need to be connected to some type of transmission controller connected to a communications line. Sanemitsu suggests an ISDN telephone line. This is a severe limitation making the device totally useless in most PDA type of environments where a communications line is not always available. In combination, the size of the PCMIA card and the requirement for connection to a communication line make this solution completely impractical for modem mobile personal digital assistants.

In U.S. Pat. No. 5,948,086 Lin describes an electronic still camera that is adapted for use with a portable computer that is equipped with a housing for receiving a removable and rechargeable battery pack. This arrangement also has a number of problems similar to Sanemitsu's camera. First, the size of a rechargeable battery pack overwhelms any modern PDA. Second, this camera presumes that the device is equipped with a removable battery. This is not the case with most PDAs, which are powered by disposable batteries.

In other configurations, the camera is loosely tethered to the PDA. This presents an ergonomic problem since it is awkward to handle both the PDA and camera at the same time.

Therefore, it is desired to provide a camera system for a PDA that is entirely mounted outside the PDA device in a rigid and ergonomic manner.

As a second characteristic, prior art cameras only acquire still or moving images. Other than controlling exposure, there is very little control of how the images are acquired. Therefore, there is a need for a camera that can be used with a PDA so that the PDA can control higher level camera functions, such as image enhancement, x-y projections, resolution, and the like.

There is even a greater need for an adaptable camera system that can also perform computer vision applications.

Over the years, a number of computer vision applications have been recognized as useful tools. Such applications include object recognition, content based image retrieval, visual navigation, robotics, surveillance, human-computer interface, virtual reality, 3D shape recovery, and medical and industrial vision problem. In the prior and, computer vision applications typically consume the bulk of a workstation computing resource. It is unlikely that any known PDA is configured to perform computer vision applications on images acquired by an attached camera. Therefore, it is desired to provide a PDA with computer vision capabilities as an accessory.

SUMMARY OF THE INVENTION

An accessory is adapted to operate with a personal digital assistant. The accessory includes a housing and an electrical interface externally accessible by the personal digital assistant. A pair of opposing members are arranged on the housing to mount the personal digital assistant in a fixed relationship with the accessory. The opposing members are spring loaded by a spine portion of the housing.

In one aspect of the invention, the accessory is a computer vision system adapted to operate with a personal digital assistant. The system includes an image sensor for acquiring images. An sensor microprocessor is coupled to the sensor. A vision microprocessor is coupled to the sensor microprocessor and an instruction memory and a data memory. A communication interface is coupled to the vision microprocessor, and for interfacing with the digital personal assistant.

BRIEF DESCRIPTION OF THE DRAWINGS

FIG. 6 is a side view of the computer vision system;

FIG. 7 is a front view of the computer vision system;

DETAILED DESCRIPTION OF THE PREFERRED EMBODIMENT

Figure 1:
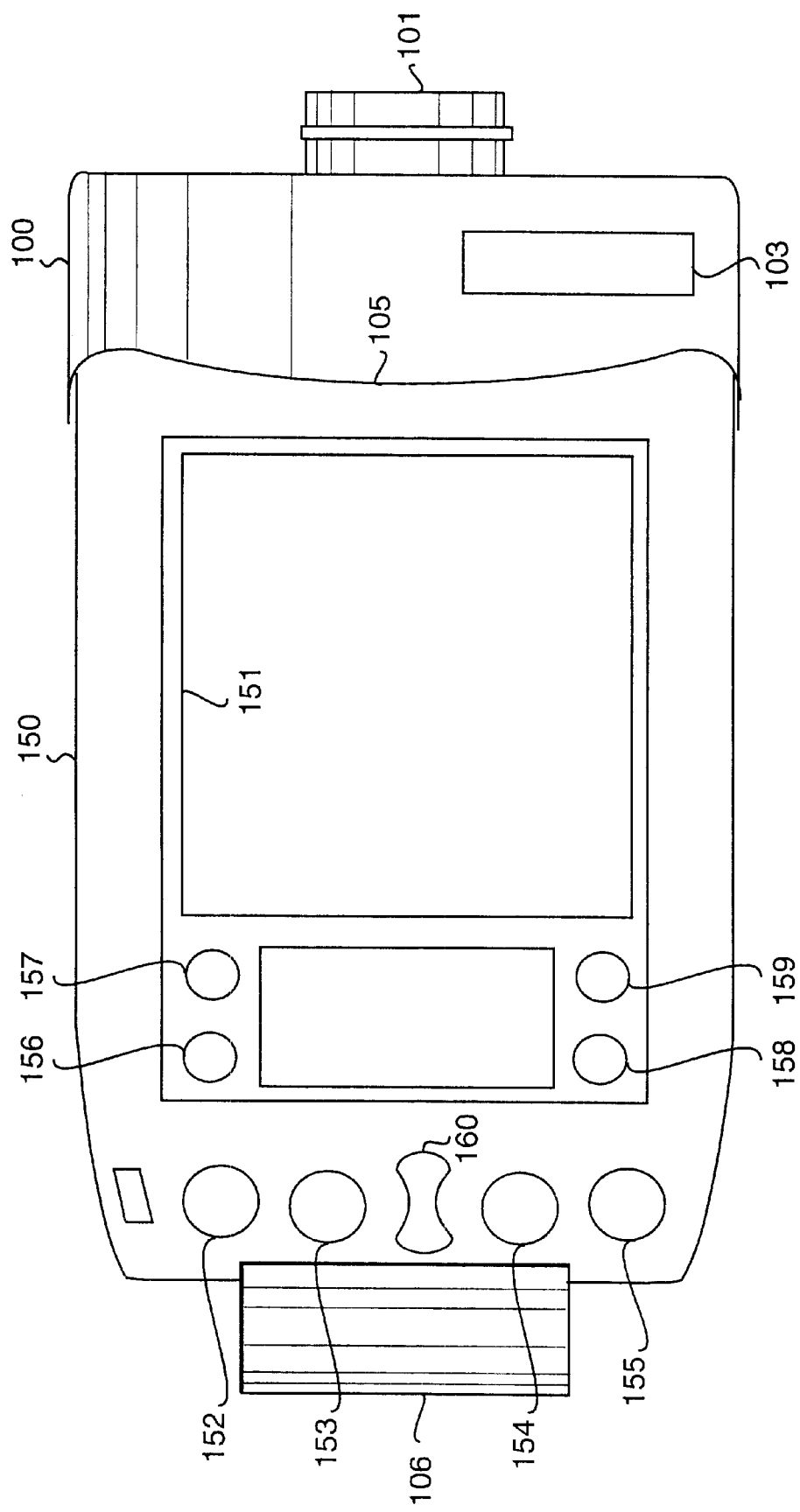
FIG. 1 is a top view of a computer vision system accessory adapted for use with a personal digital assistant.
Figure 2:
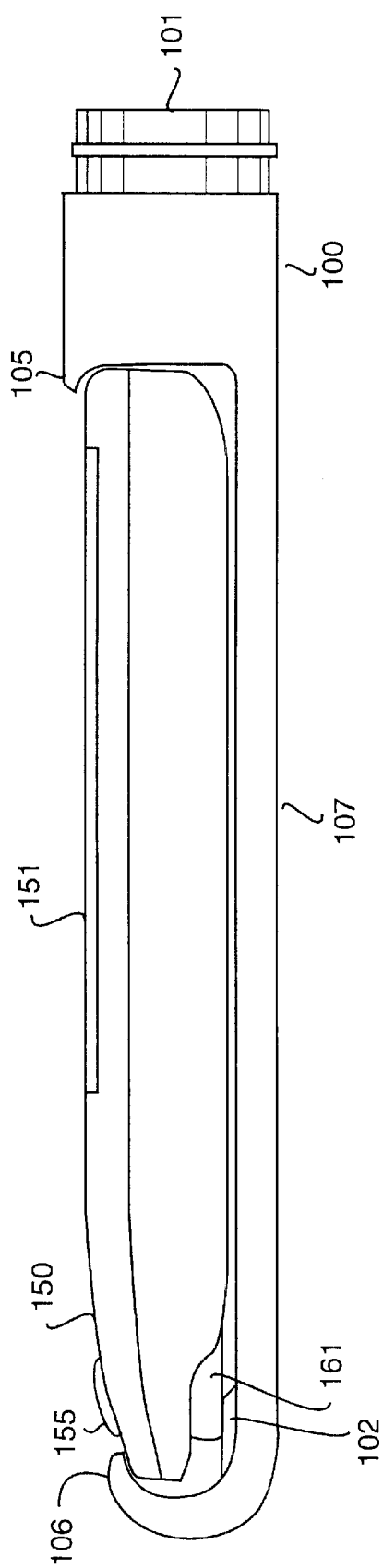
FIG. 2 is a side view of the computer vision system adapted for use with a personal digital assistant.
Figure 3:
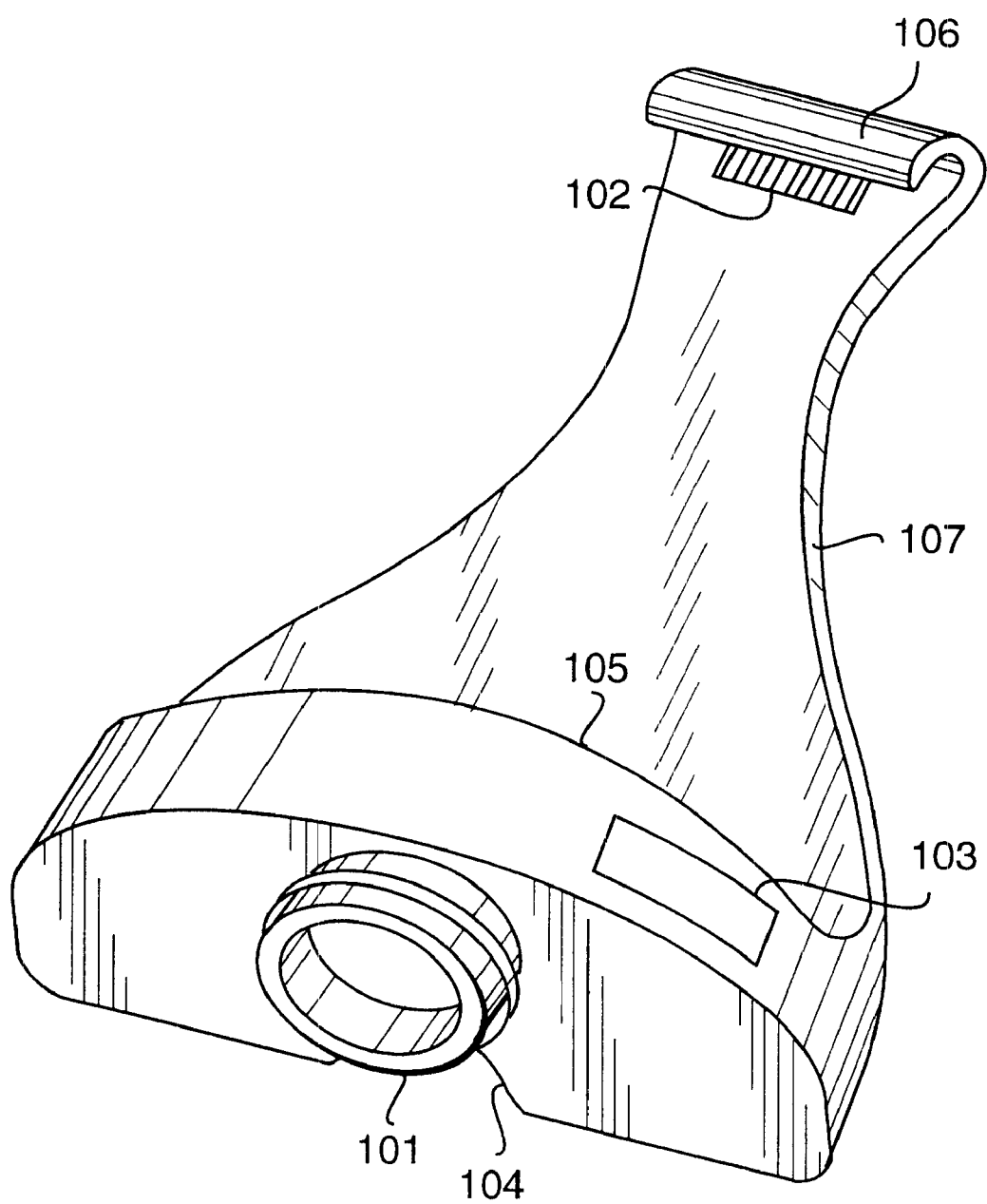
FIG. 3 is an oblique view of the computer vision system.
Figure 4:
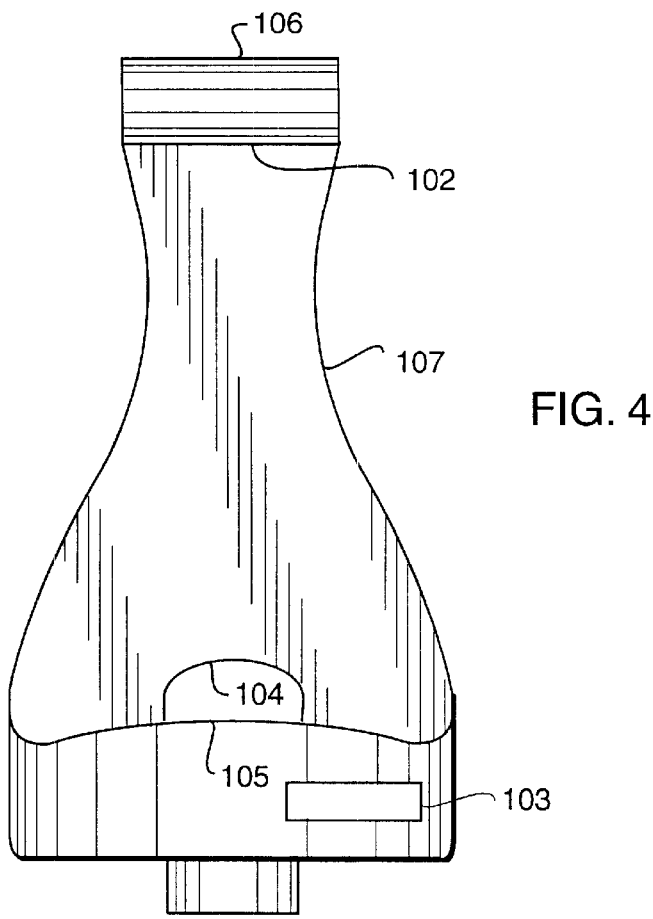
FIGS. 4 and 5 are top and bottom views of the computer vision system.
Figure 5:
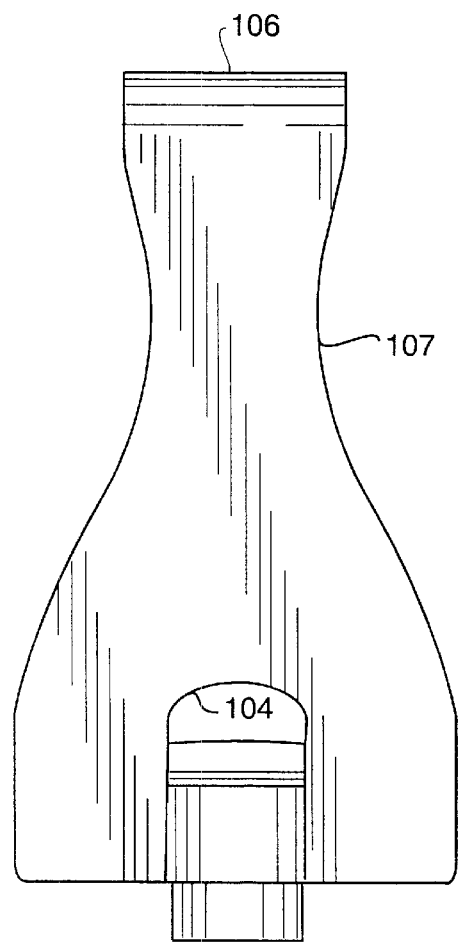

FIGS. 1 and 2 respectively show top and side views of a preferred embodiment for a computer vision system accessory adapted for use with a handheld personal digital assistant (PDA) 150. The accessory vision system includes a lens 101, and a (RS232) serial connector 102. A lid 103 is disposed on the top of a housing 100 of the computer vision system for accessing a battery compartment.

The computer vision system is held in place with respect to the PDA by a pair of opposing members 105–106. The members are spring loaded toward each other by a spine portion 107 of the housing 100 so as to rigidly retain the PDA between the members. Therefore, as an advantage, the vision system 100 has no part internal to the PDA. Instead, the system is housed entirely outside the PDA while retaining the ergonomic operability of the PDA.

The PDA 150 to which the computer vision system is adapted includes a display screen 151, hardware buttons 152–155, silk-screened buttons 156–159, a scroll button 160, and a serial port 161. The serial port is externally accessible. The PDA also includes an infra-red transceiver 170, described further below. The PDA shown is a PalmIII PalmPilot™ handheld computing device. It should be understood that the accessory can be adapted for use with other similar handheld PDA devices.

FIGS. 3–7 show various views of the accessory adapted according to the invention. In this configuration, the members 105–106 of the computer vision system are disposed on front and back portions of the housing.

These Figures also show a cut-out 104 in the housing to accommodate the above-mentioned infra-red transceiver of the PDA 150. By having the cut-out, the infra-red transceiver can operate while the computer vision system is mounted on the PDA. Depending on the PDA, the cut-out can be repositioned, or a light guide can be provided to permit external access to the active components of the transceiver.

Figure 8:
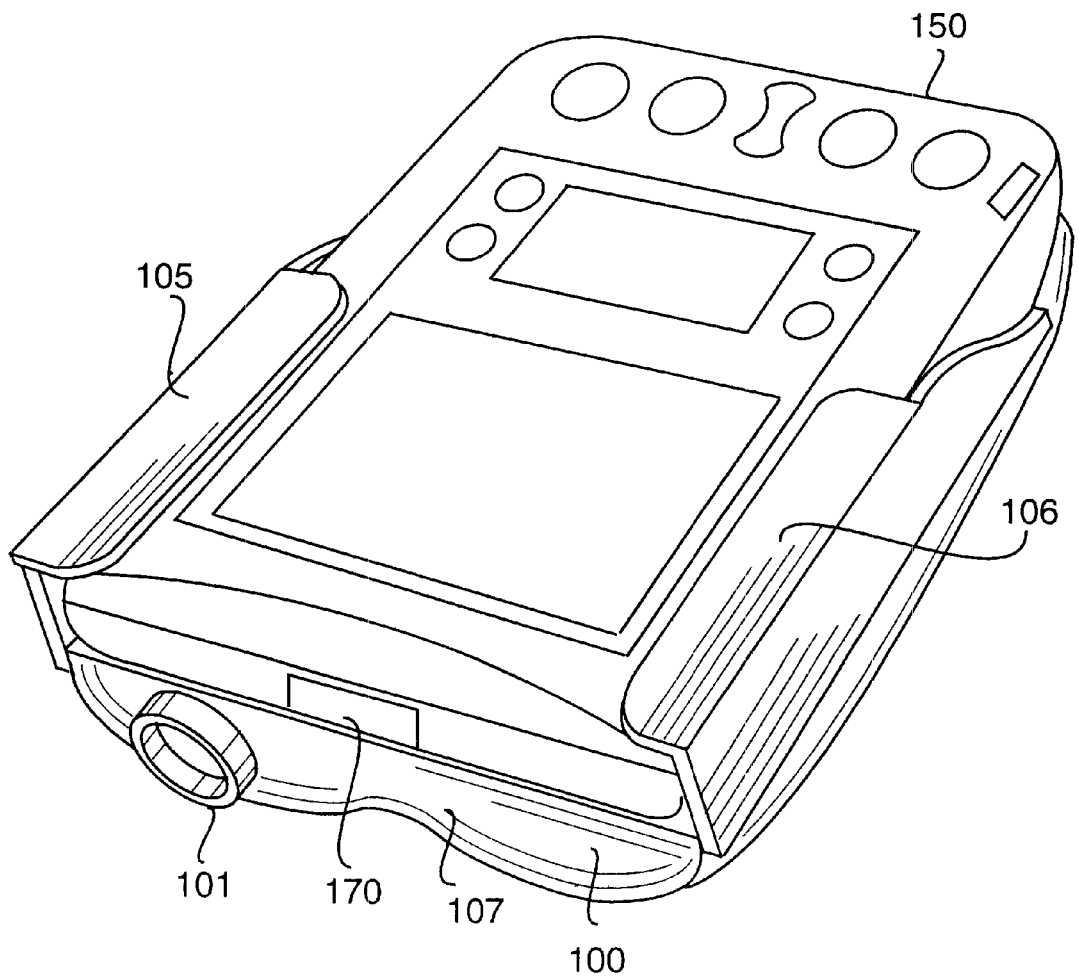
FIG. 8 is an oblique view of an alternative embodiment of the digital camera adapted for use with the personal digital assistant.
Figure 9:
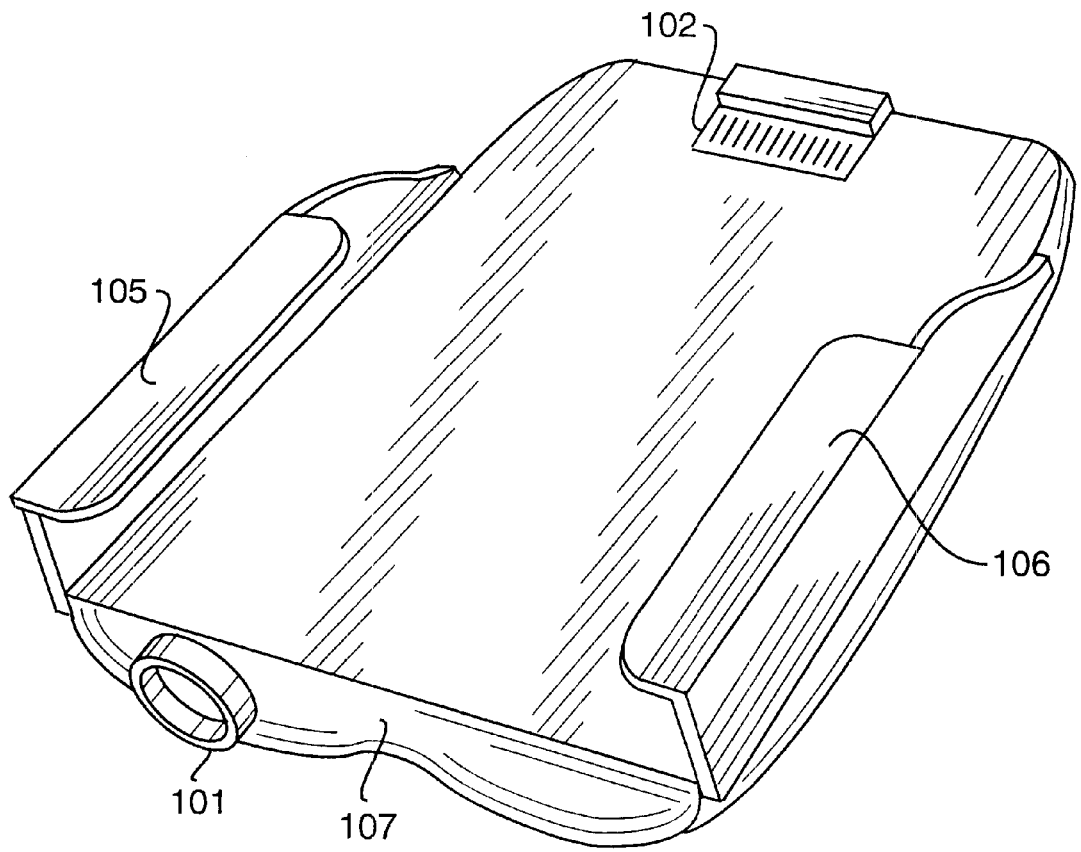
FIG. 9 is an oblique view of the alternative embodiment of the digital camera.

FIGS. 8 and 9 show an alternative configuration of the computer vision system. In this configuration the pair of members are disposed on a first and second side portions of the housing 100. Also, because the computer vision system is mounted entirely underneath the PDA, no part of the computer vision system obscures an infra-red transceiver 170 of the PDA 150, see FIG. 8.

The computer vision system according to one embodiment of the invention uses an "Artificial Retina" (AR) for acquiring images, Mitsubishi Electric Inc. part number M64283FP. The AR is a CMOS image sensor with 128×128 pixels. The AR chip achieves high performance, up to 25 Hz for full frames, and higher for partial frames. Power consumption is 15 mW. The AR chip can execute the 1D and 2D projection of an input image. The projection sums all pixels in columns in the vertical direction and rows in the horizontal direction. The image area is approximately 9 $mm^2$. The relative small size (11×7 mm) and low cost of the AR makes this sensor ideal for PDA applications as described herein.

In another embodiment, the sensor is a color CMOS image sensor, Mitsubishi Electric part number M64289U. This sensor has a resolution of 352×288 pixels, and can acquire up to thirty frames per second. The sensor has exposure and gain control.

As another feature, the sensor is mounted on a single semiconductor substrate with a sensor microprocessor that can perform a number of low-level image processing tasks under user control. As is described below, the system according to the invention, allows the PDA to control the sensor's microprocessor.

Figure 10:
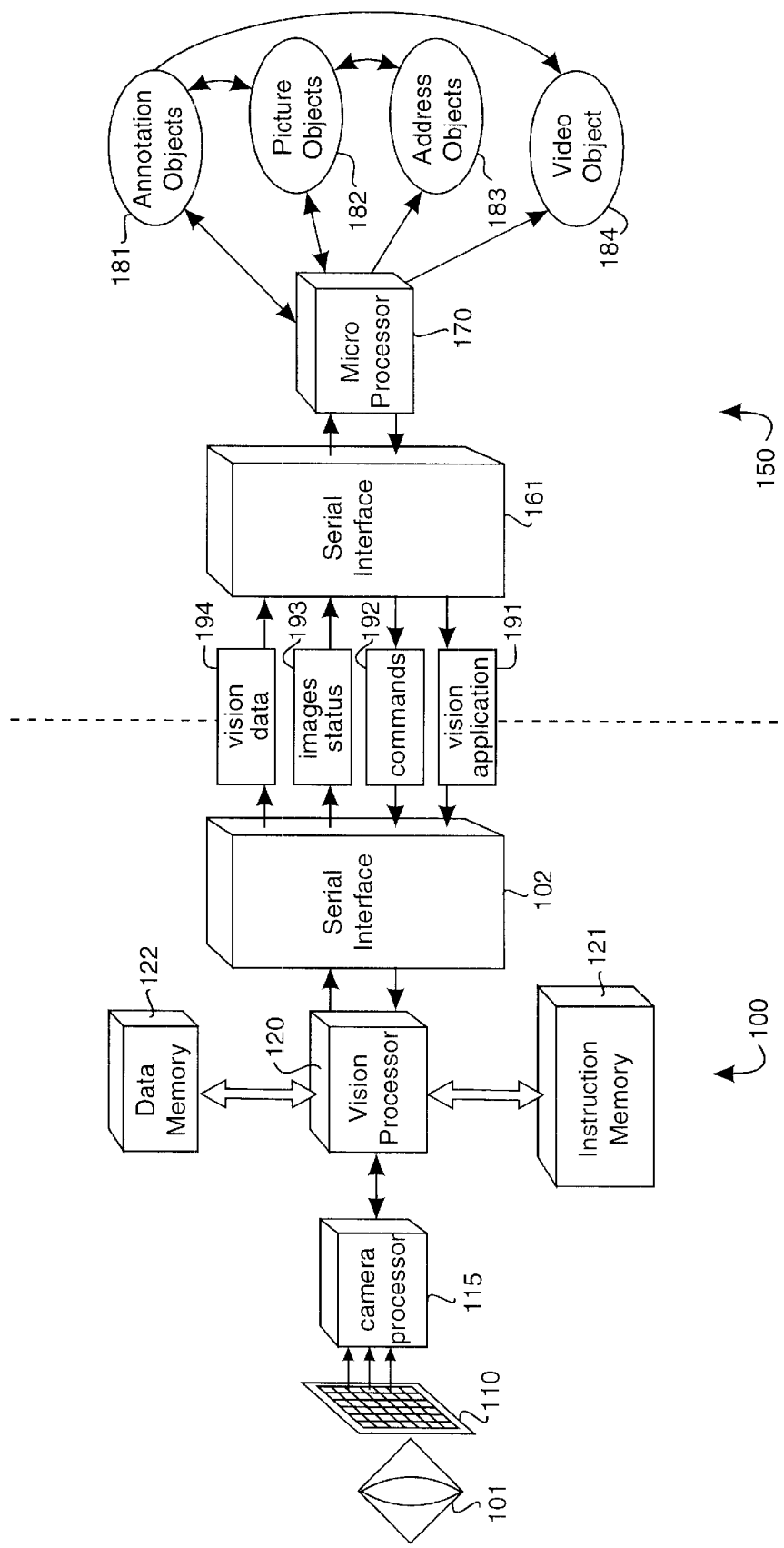
FIG. 10 is flow diagram of modes of operation of the digital camera and personal digital assistant.

FIG. 10 shows how the various components of the computer vision system and PDA interact. The computer vision system acquires images through the lens 101. In the preferred embodiment as described above, an image sensor 110 uses CMOS technology, unlike the CCD devices of the prior art. The sensor 110 is co-resident and controlled by a sensor microprocessor 115 as described above.

In addition, the system includes a vision microprocessor 120. The vision microprocessor has access to an instruction memory 121 that stores programs, such as vision applications, and a data memory 122. In one embodiment, the vision processor is a Mitsubishi Electric Inc., single chip, CMOS RISC microcomputer, part number M16.

As a feature, the memories 121–122 can be downloaded with instructions and data from the PDA to configure the computer vision system for particular vision applications, such as object recognition, human-computer interfacing, pattern recognition, virtual reality and the like.

The computer vision system and PDA 150 communicate via serial interfaces 102 and 161. Via a user interface, the PDA sends vision applications 191 and commands 192 to the computer vision system. In response to the commands and vision applications, the computer vision system sends images and status 193 and vision data 194 to the PDA.

The PDA includes a microprocessor 170 for generating the commands and vision applications, and for processing and displaying the images, status information, and vision data. The PDA also includes a memory for storing the images as data objects 182 and 184. The data objects can be picture objects 182 (still images), or video objects 184 (a sequence of images). The PDA also stores other data objects 181 and 183. In the preferred implementation, the images acquired by the computer vision system are stored in the same format as the PDA's data objects. This formatting can be done by the vision processor 120.

OPERATION

Figure 11:
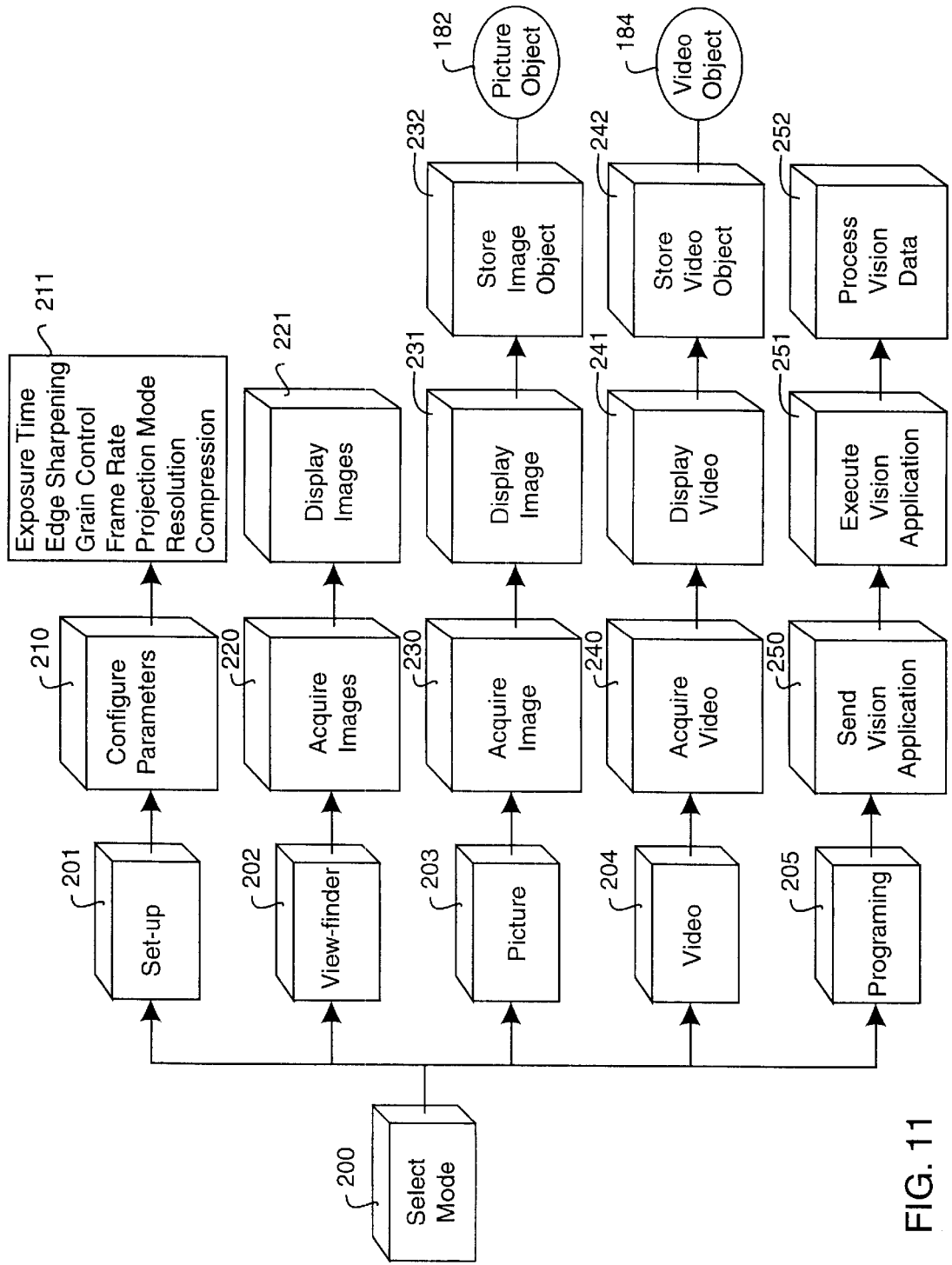
FIG. 11 is a flow diagram of operating modes.

As shown in FIG. 11, a user operates the computer vision system and PDA by selecting 200 one of five basic modes, setup 201, view-finder 202, picture 203, video 204, and programming 205. Operation is performed by using the buttons and the display of the PDA 150.

In setup mode 201, the PDA configures 210 computer vision system parameters 211. Computer vision system parameters 211 include exposure, 1D or 2D edge extraction, gain control, frame rate, sensitivity, resolution, compression, and projection mode. Edge extraction is an important precursor step for object recognition tasks in a vision application. In projection mode, the pixels in horizontal rows and vertical columns are summed. This later feature enables, for example, motion, image analysis, and compression applications. The user can also crop images to selected areas of the sensor 110 by specifying a subset of the pixels as active. If the computer vision system has a black and white sensor, then one to eight bit of gray scale can be selected. For a color sensor, up to 24 bits of RGB values can be acquired. Compression can format a picture object as a JPEG file, and a video object as a MPEG file. Other compression standards are also possible. Even if the PDA can only display one or two bits of gray scale, the PDA can still acquire and store images of greater bit depth for display elsewhere.

In view-finder mode 202, the computer vision system acquires images 220, and the PDA displays the images 221 on the display screen 151. However, current image data objects are stored only temporarily in the PDA's memory.

In picture mode 203, the computer vision system acquires images 230, the PDA temporarily stores and displays the images 231, and permanently stores one selected image 232 as a picture object 182.

In video mode 204, the computer vision system acquires a sequence of images 240, i.e., a video. The PDA displays the video 241, and stores the video 242 as a video object 184. In the case that the PDA memory is insufficient, picture and video objects can be up-loaded to a PC or other type of computer using either the infra-red transceiver 170, or the serial interface 161 when the computer vision system is not in use.

In programming mode 205, the user selects a vision application to down-load 250 to the computer vision system. The application is executed 251, and the PDA processes the vision data 252.

In addition, the user of the PDA can link the picture and video objects 182 and 184 to other data objects 181 and 183 managed by the PDA. For example, a picture of a person can be linked to the person's address, a business card object, a facsimile, a message, and the like. Similarly, other video objects can be linked to other objects managed by the PDA.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. An accessory adapted to operate with a personal digital assistant, comprising:

a housing including a spine portion;

a communications interface arranged on the housing, the communications interface externally accessible by the personal digital assistant; and a pair of opposing members arranged on a front and back portion of the housing, and spring loaded by the spine portion, to rigidly mount the personal digital assistant in a fixed relationship with the accessory.

2. The accessory of claim 1 wherein the housing is entirely external to the personal digital assistant when the accessory is mounted on the personal digital assistant.

3. The accessory of claim 1 wherein the pair of opposing members are arranged on a first and second portion of the housing.

4. The accessory of claim 1 wherein the digital person assistant includes an infra-red transceiver, and the housing includes a cut-out aligned with the infra-red receiver.

5. The apparatus of claim 1 wherein the housing further comprises:

an image sensor configured to acquire images;

a sensor microprocessor coupled to the sensor; and a vision microprocessor coupled to the sensor microprocessor and an instruction memory and a data memory.

* * * * *